United States Patent
Bautista (10) Patent No.: US 9,520,021 B2
(45) Date of Patent: Dec. 13, 2016

(54) CONTEST AT A TARGET GAME LOCATION

(71) Applicant: Anthony D Bautista, Arroyo Grande, CA (US)

(72) Inventor: Anthony D Bautista, Arroyo Grande, CA (US)

(*) Notice: Subject to any disclaimer, the term of this patent is extended or adjusted under 35 U.S.C. 154(b) by 155 days.

(21) Appl. No.: 14/207,177

(22) Filed: Mar. 12, 2014

(65) Prior Publication Data

US 2014/0194185 A1 Jul. 10, 2014

Related U.S. Application Data

(63) Continuation-in-part of application No. 13/405,864, filed on Feb. 27, 2012, now abandoned.

(51) Int. Cl.
*G06F 17/00* (2006.01)
*G07F 17/32* (2006.01)
*A63F 13/216* (2014.01)

(52) U.S. Cl.
CPC ......... *G07F 17/3227* (2013.01); *A63F 13/216* (2014.09); *G07F 17/3258* (2013.01)

(58) Field of Classification Search
CPC . G07F 17/3227; G07F 17/3258; A63F 13/216
See application file for complete search history.

(56) References Cited

U.S. PATENT DOCUMENTS

| | | | | |
|---|---|---|---|---|
| 2010/0332310 A1* | 12/2010 | Russell | .................. | G06Q 30/02 705/14.36 |
| 2013/0054335 A1* | 2/2013 | Kjelsbak | ............. | G06F 3/04883 705/14.26 |
| 2013/0079142 A1* | 3/2013 | Kruglick | ............ | G06Q 30/0251 463/40 |
| 2013/0204706 A1* | 8/2013 | Tang | ...................... | G06Q 30/08 705/14.58 |
| 2013/0225297 A1* | 8/2013 | Bautista | ............. | G06Q 30/0209 463/42 |
| 2013/0275221 A1* | 10/2013 | Zeto, III | ............ | G06Q 30/0261 705/14.58 |
| 2013/0324219 A1* | 12/2013 | Vann | ....................... | G07F 17/32 463/25 |
| 2014/0019246 A1* | 1/2014 | Fraccaroli | ............. | H04W 4/021 705/14.58 |

* cited by examiner

*Primary Examiner* — Pierre E. Elisca
*Assistant Examiner* — Carl V Larsen
(74) *Attorney, Agent, or Firm* — Douglas L. Weller (57) ABSTRACT

To conduct a contest, game parameters are downloaded from a server to a device in response to a player app being launched on the device. The player device displays available games that can be played by a player, the games including target game locations from which the games can be played. A player is allowed to select a game to play only when the player is within a predetermined distance of a target game location and when check-ins are still available for the game. A jackpot prize is awarded to the player if the player is a winner of a game selected by the player. The player is entered in a raffle if the player is not the winner of the game selected by the player.

20 Claims, 9 Drawing Sheets

CONTEST AT A TARGET GAME LOCATION

BACKGROUND

With the advent of the Internet, various internet based games have at times attracted attention. For example, geocaching is a game in which "caches" are hidden (either inside or outside) in urban or rural areas. A player obtains the coordinates (usually latitude and longitude) of a hidden cache from an internet site. Along with the coordinates, the internet site may provide other clues helpful to the player in finding the cache. The player then searches for the cache based on the received coordinates of the cache and any other provided clues. For example, the player can enter the received coordinates into a global positioning satellite (GPS) receiver. The cache is typically a waterproof, sealed container. In the container may be stored, for example, a logbook and a writing instrument. The cache may also include other items such as a book, CD video, DVD, trinket and so on. Some games may request a player that takes an item stored in a cache to replace it with another item with similar or greater value.

DETAILED DESCRIPTION

A mobile device, such as a mobile phone, tablet, personal digital assistant or portable computer, is used to implement a contest. The mobile device receives by download the contest parameters. The parameters may include, for example, a prize and a winning number. The parameters may also include, for example, a contest sponsor. The mobile device also receives location of a target. For example, depending on the contest implementation, the target may be mobile or fixed. For example, the location of the target may be marked and shown on a map on the display of the mobile device.

The goal of the contest is for a player to reach the target. The winning number indicates which player who reaches the target is the winner. For example, if the winning number is ten, the tenth player to reach the target is the winner.

In one embodiment of the contest, the target is a person and the mobile device receives and displays to the player a picture of the target. When the player presents himself or herself to the target, if that makes the total number of players that have presented themselves to the target equal to the winning number, the player is the winner. The winner receives the prize from the target. Other players that present themselves to the target may get an award, such as a coupon. Other players that present themselves to the target not equal to the winning number will be entered into a raffle with a chance to win a consolation prize, such as a gift card.

In another embodiment of the contest, the player device sends a ping to a game server or the target when the player is within a predetermined distance from the target, i.e., has reached the target. If the player is the number of the player reaching the target is the winning number, the player is the winner. The winner receives the prize, for example, by reception of transmission of a gift card from the game server to the player device. Other players that reach the target by sending a ping when within a predetermined distance from the target, but are not the winning number, are entered into a raffle with a chance to win a consolation prize, such as a coupon or gift card, through electronic transmission.

Figure 1:
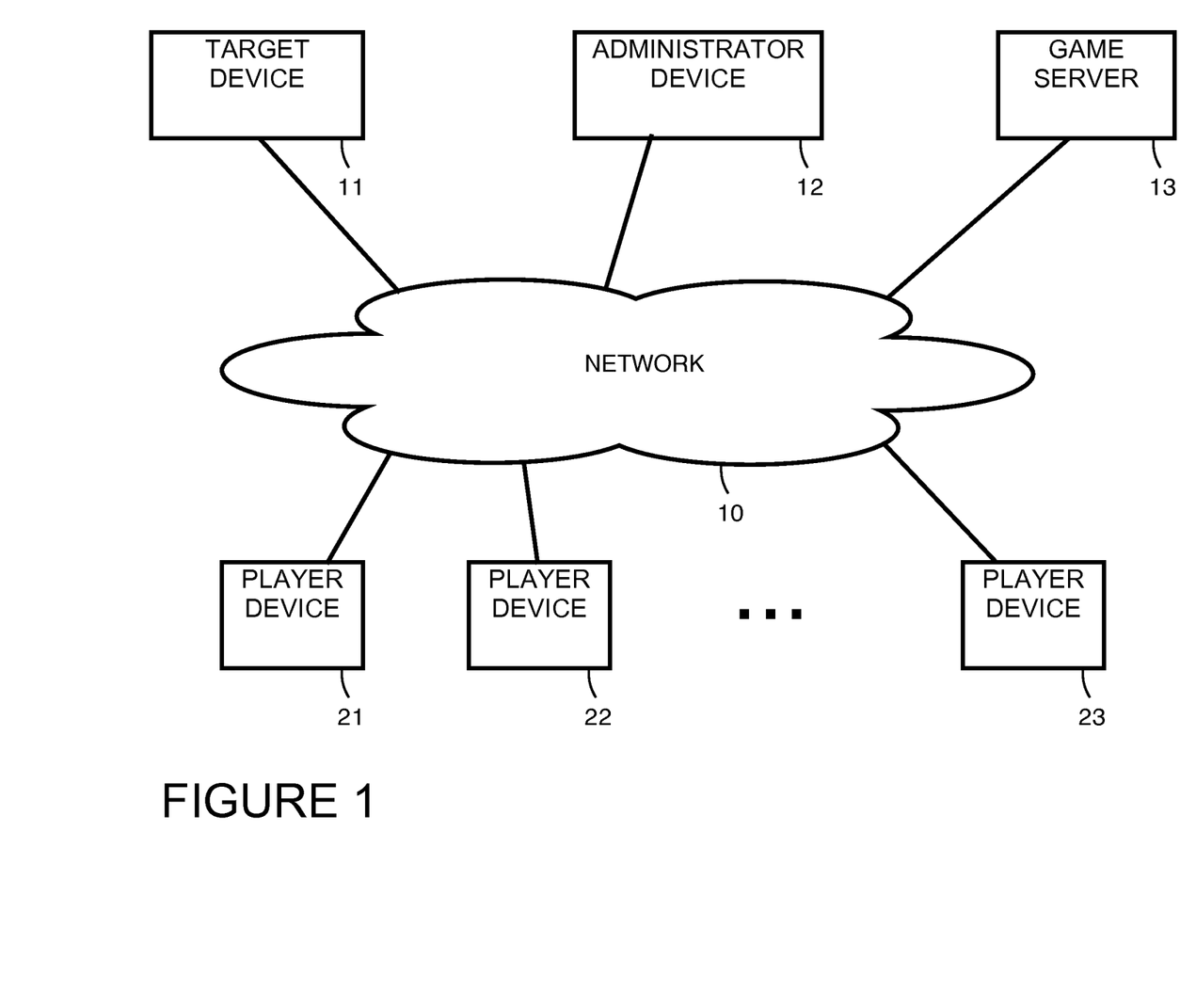
FIG. 1 is a simplified block diagram showing network devices utilized in a contest in accordance with an embodiment.

FIG. 1 is a simplified block diagram showing devices that may be used in a contest. An administrative device 12 is used to set up the game. A game server 13 interacts with player devices to administer the game. In FIG. 1, the player devices are represented by a player device 21, a player device 22 and a player device 23. Depending upon how the contest is implemented, a target device 11 may maintain communication with the administration device 12 and/or with the game server 13. In some implementations, target device 11 may also communicate with player devices, represented by player devices 21 through 23.

Communication between devices is accomplished through a network 10. Network 10 is representative of a number of network options. These networking options may include any communication network through which communication occurs, or any combination of communication networks. Examples of such communication networks include the Internet, cellular networks, public telephone networks, and so on.

Figure 2:
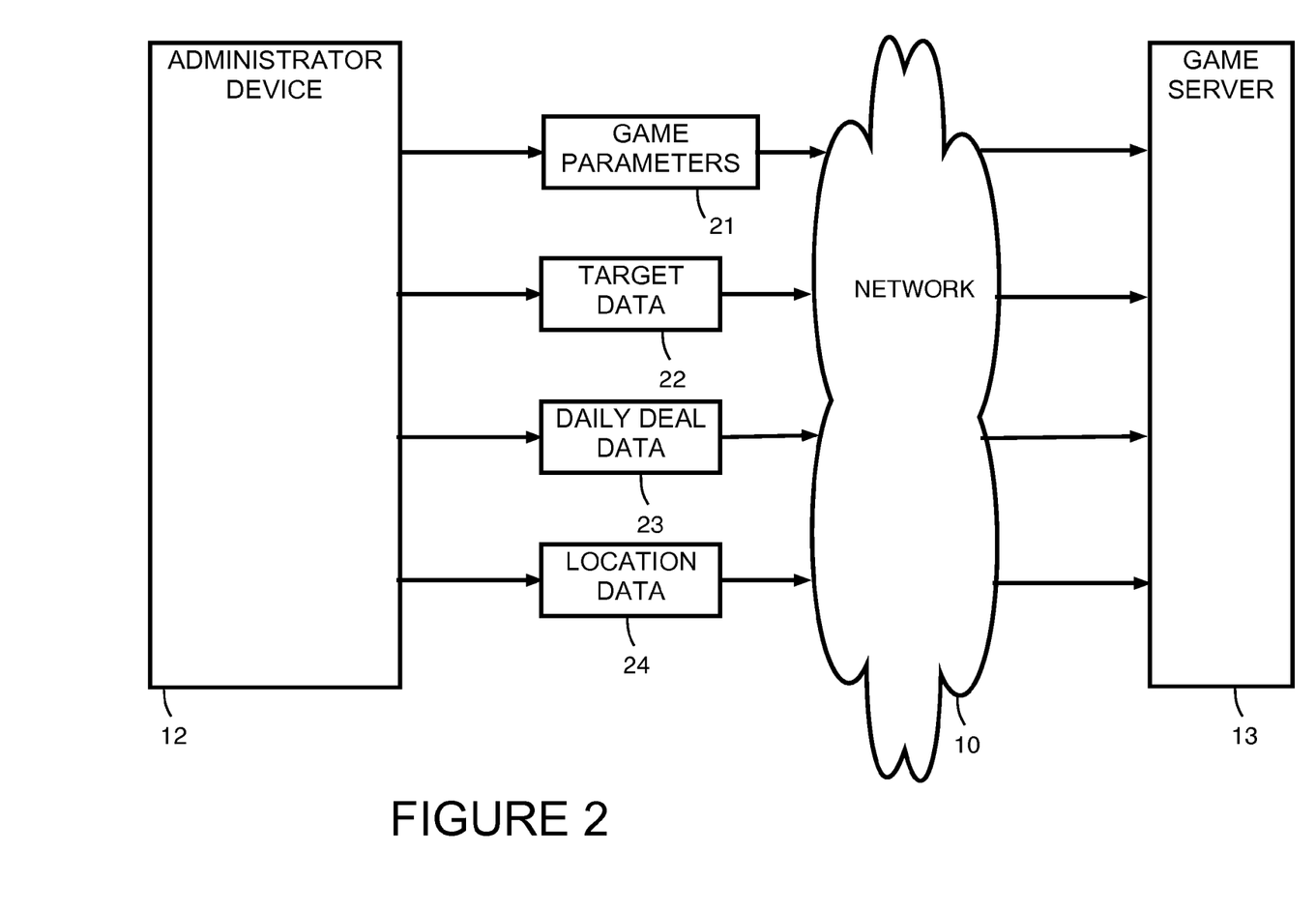
FIG. 2 is a simplified block diagram illustrating communication between an administrative device and a game server in accordance with an embodiment.

FIG. 2 is a simplified block diagram illustrating communication between administrative device 12 and game server 13 through network 10. In order to set up a contest, administrative device 12 forwards to game server 13 game parameters 21, target data 22, daily deal data 23 and location data 24. For example, game parameters 21 include details about a prize, a winning number and a contest sponsor. Target data 22 includes, for example, information about the target such as a picture of a person who is the target. Daily deal data 23 includes, for example, awards and/or a coupon available to all players. Location data 24 includes, for example, a current location of the target and may optionally include a map that shows current location of the target.

Figure 3:
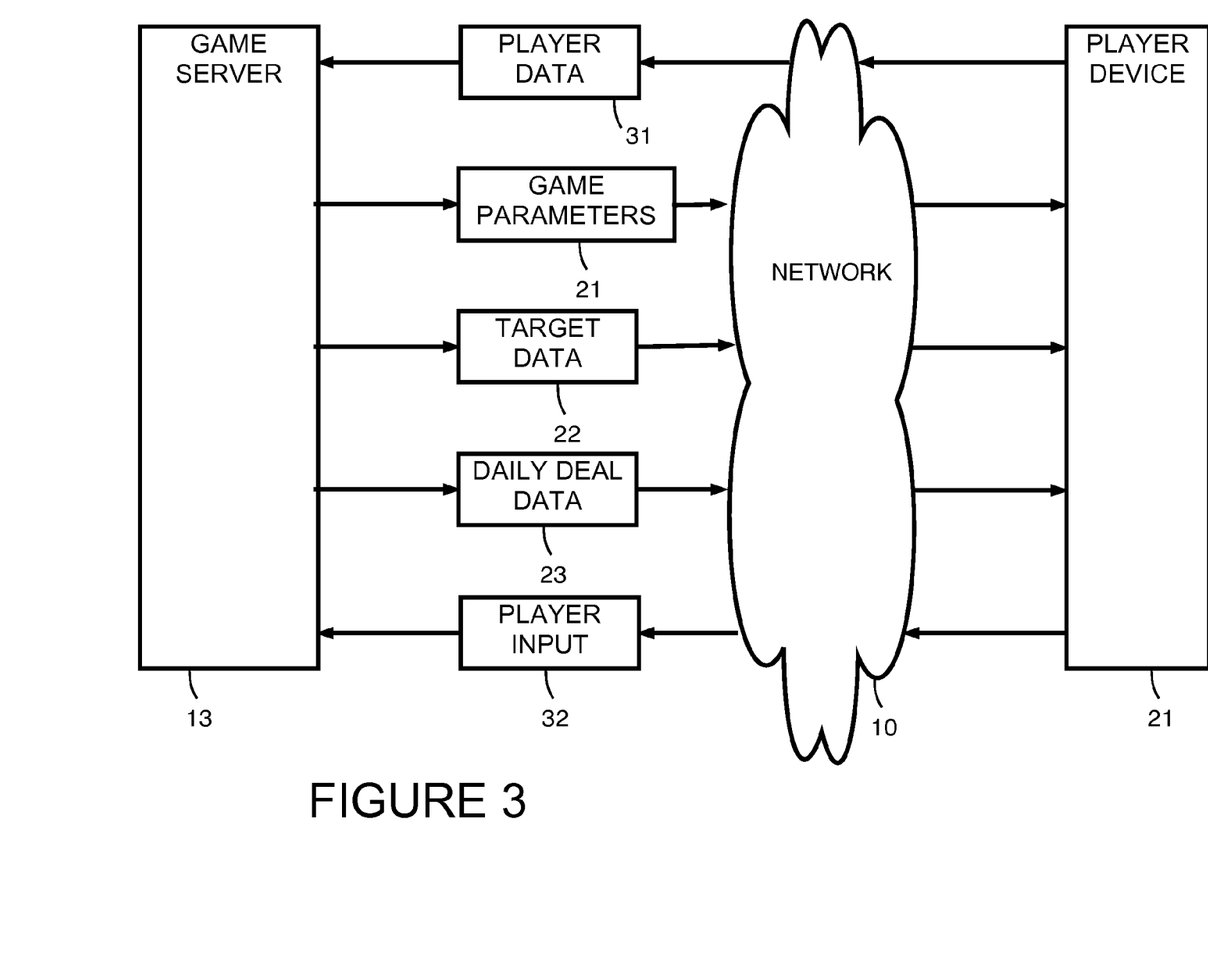
FIG. 3 is a simplified block diagram illustrating communication between a game server and a player device in accordance with an embodiment.

FIG. 3 is a simplified block diagram illustrating communication between game server 13 and player device 21 through network 10. Game server obtains player data 31 from player device 21. Player data 31 includes, for example, player name and contact data for the player. The contact data can be one or more of e-mail address, mailing address, phone number, facebook identity and so on.

Game server 13 forwards to player device 21 game parameters 21, target data 22 and daily deal data 23. Depending upon implementation, game server 13 can also forward to player device 21 current target location. Player device 21 sends player input 32 to game server 13. Player input 32 includes, for example, confirmation indicating whether the player is taking part in the current contest. In some embodiments, player input 32 includes, for example, a ping giving player location used to determine whether the player device 21 is within the predetermined distance of the target. Additional communication between game server 13 and player device 21 can include, for example, depending upon implementation, transmission of a prize, consolation prize, coupon or gift card dependent upon how well player does in the contest. Game server 13 can also solicit evaluation feedback about the contest and customer satisfaction information from the player.

Figure 4:
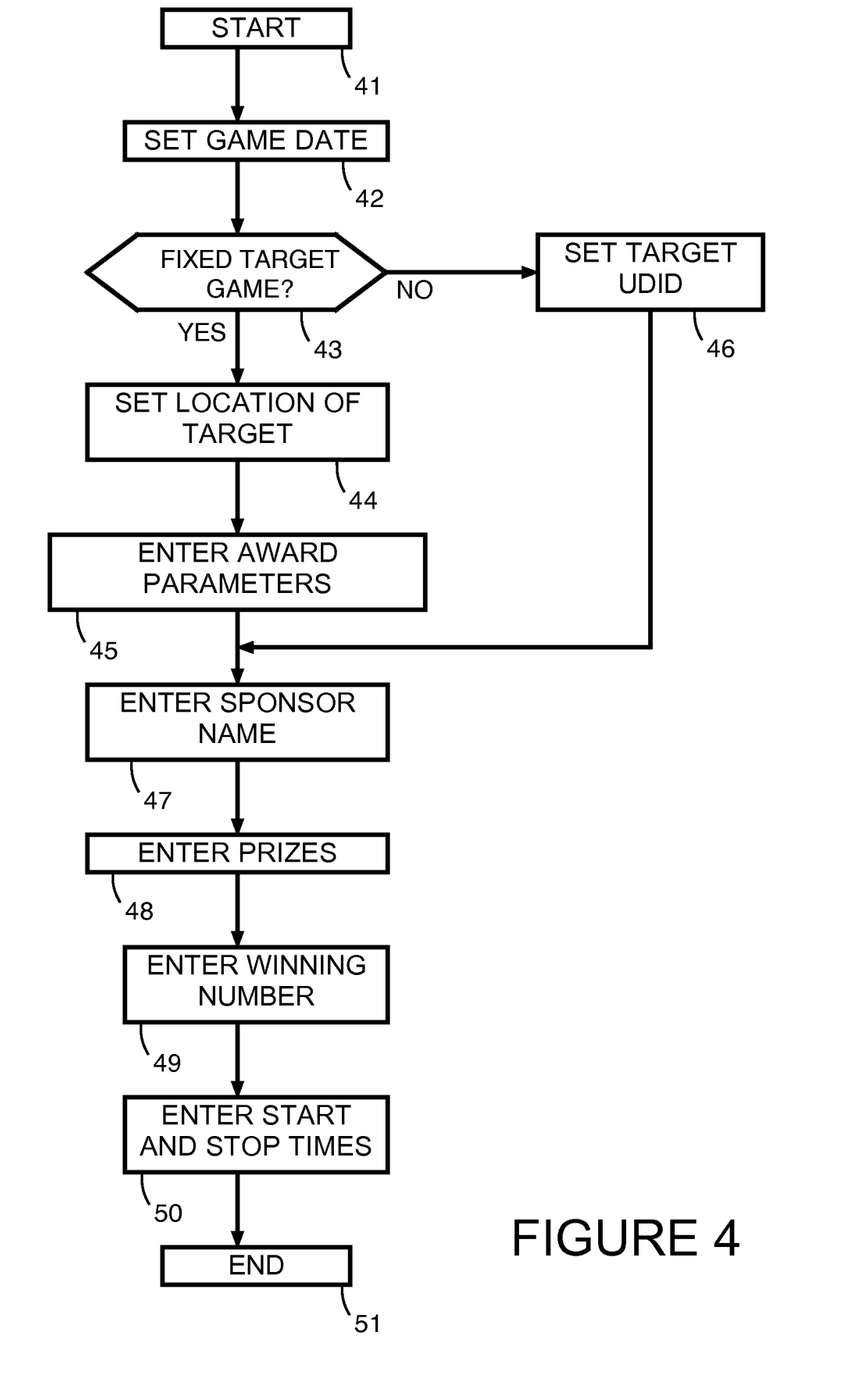
FIG. 4 is a simplified flowchart illustrating operations of an administrative device obtaining game parameters and other information from a contest administrator in accordance with an embodiment.

FIG. 4 is a simplified flowchart illustrating operations of administrative device 12 obtaining game parameters and other information from a contest administrator. In a block 41, administrative device 12 starts obtaining information about a new contest. In a block 42, administrative device 12 obtains game date indicating the date on which the contest will be held.

In a block 43, administrative device 12 obtains an indication from the contest administrator as to whether the target will be in a fixed location or mobile. If the target will be in a fixed location, in a block 44, a location of the target is set. In a block 45, award parameters are set indicating, for example, coupons that will be offered to a player that comes to the target location but does not get there in accordance to the winning number. For example, if the location is a commercial establishment, the daily deal coupon may be a coupon that can be used at that commercial establishment for a discount on an item for sale such as a food item, a beverage, an electronic device, a non-electronic accessory and so on.

If in block 43 the contest administrator indicates the target will be mobile. In a block 46, administrative device 12 obtains from the contest administrator an identifier of the mobile device. This identifier may be, for example a unique device identifier (UDID) assigned to target device 11. The UDID will allow player devices, represented by player devices 21 through 23, to track location of target device 11 either through location information obtained from game server 13 or directly from target device 11, depending upon a particular implementation of how location information is communicated to the player devices.

In a block 47, administrative device 12 obtains from the contest administrator a sponsor name. For example, the sponsor is identified and promoted to the players through communications to the player devices. For example, the sponsor is the provider of some or all of the prizes, awards and any coupons awarded to the players of the contest. Depending upon implementation, some or all of the prizes, awards and coupons may come from some source other than the sponsor.

In a block 48, administrative device 12 obtains details about prizes from the contest administrator. For example, the details about the prizes may include information specifying an amount and sponsor of cash or a gift card to be awarded the contest winners. The details about the prizes may also include an actual electronic gift card to be forwarded electronically to the winners. Alternatively, the details about the prize may provide other information identifying the contest prizes. For example, the prizes may include a grand prize and one or more consolation prizes.

In a block 49, administrative device 12 obtains the winning number from the contest administrator. In a block 50, administrative device 12 obtains a start time and a stop time from the contest administrator. The start time indicates the date and time the contest will start. The stop time indicates the date and time the contest will stop.

In a block 51, administrative device 12 is done receiving obtaining game parameters and other information from the contest administrator.

Figure 5:
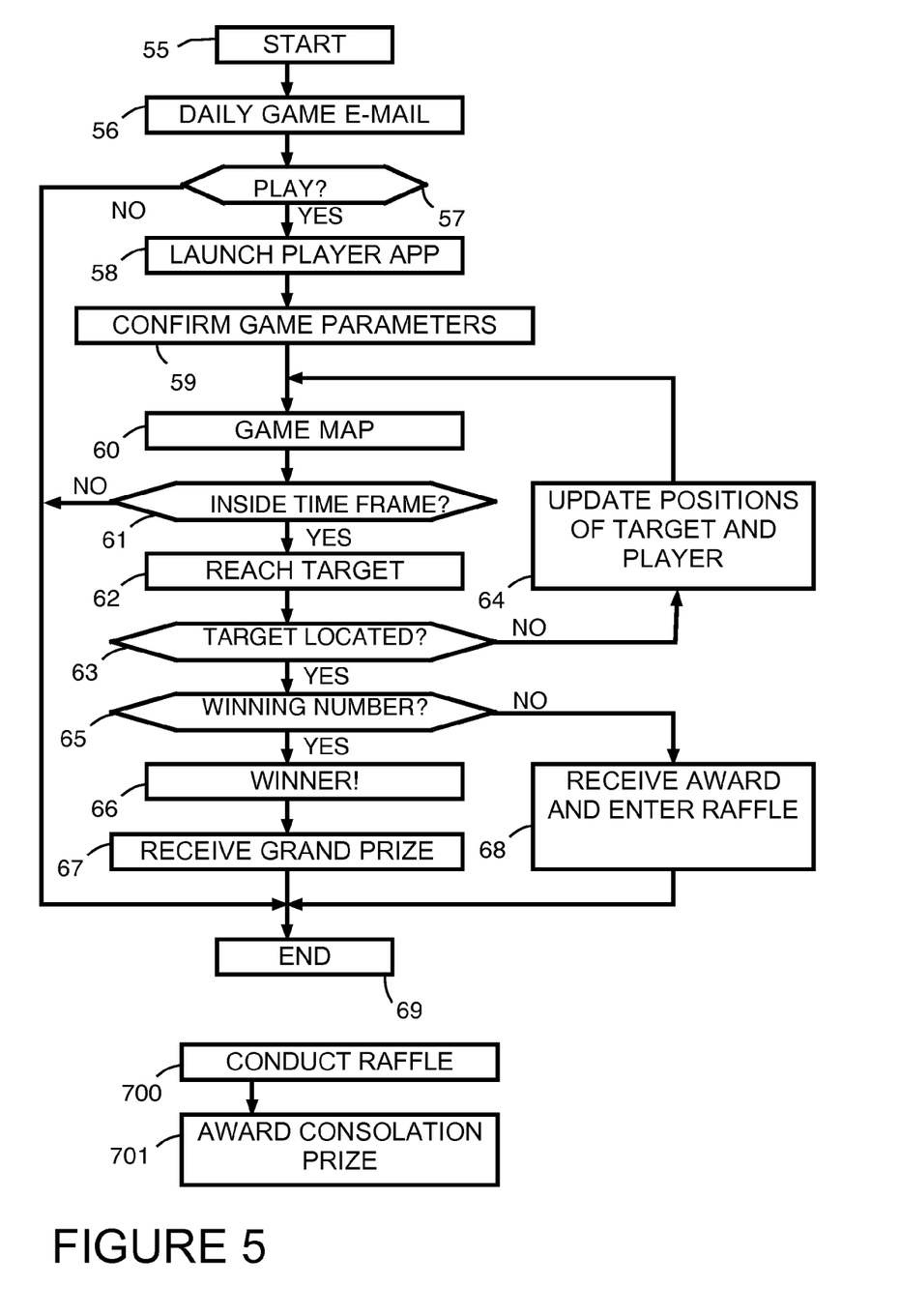
FIG. 5 is a simplified flowchart illustrating operations of a player device during participation in a contest in accordance with an embodiment.

FIG. 5 is a simplified flowchart illustrating operations of player device 21 during an example contest where the target is a person and is mobile.

In a block 55, the operations of player device 21 pertaining to a contest begins. In a block 56, a daily game e-mail is received. The daily game e-mail, for example, provides information about the contest including the prize and sponsor. Alternatively, other means can be used to communicate information about the contest such as, for example, a text message or instant message.

In a block 57, player device 21 offers the player the opportunity to play. If the player elects not to play, in a block 69, the operations of player device 21 pertaining to the daily contest ends.

If in block 57, the player elects to play, in a block 58, player device 21 launches a player application. The player application oversees operation of player device 21 pertaining to the remaining of the blocks set out in FIG. 5.

Figure 8:
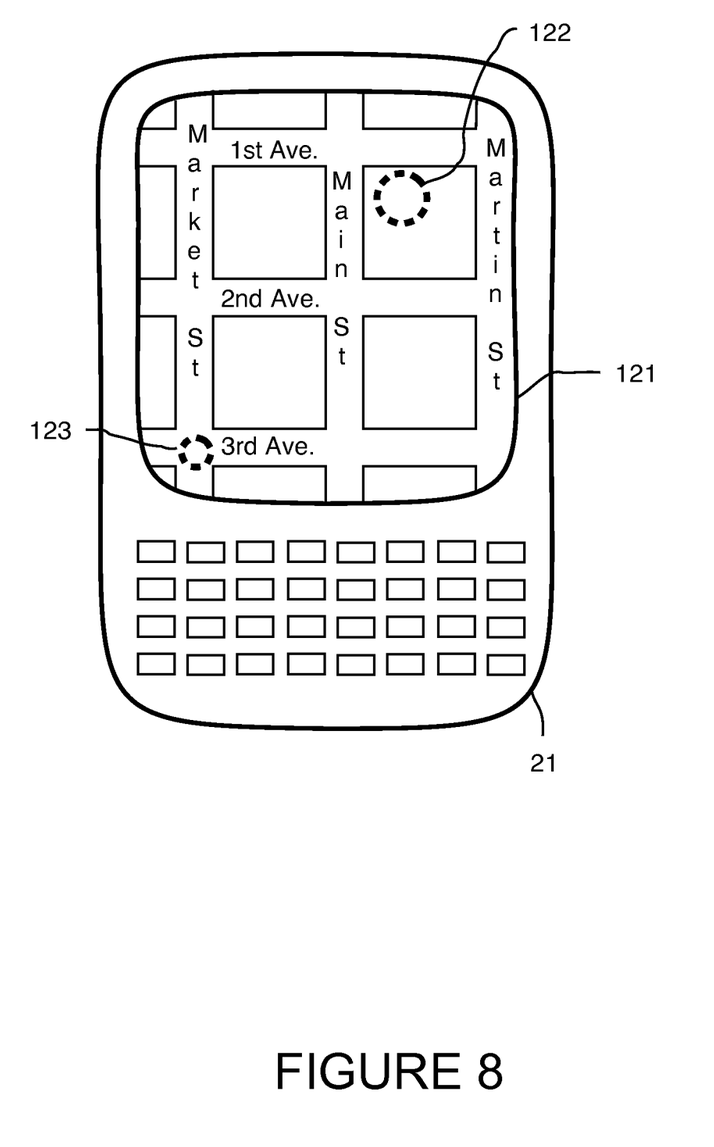
FIG. 8 is location of a target and a player being highlighted on a map displayed on a player device in accordance with an embodiment.

In a block 59, player device 21 confirms with game server 13 the game parameters. In a block 60, player device 21 displays a game map to the player. The game map includes a marked location of the target. This is illustrated by FIG. 8. In FIG. 8, player device 21 is shown to be, for example, a mobile phone. As a mobile phone, player device 21 includes networking hardware that allows communication to other devices, for example, through a cellular network, or through the internet using a technology such as Wi-Fi. A display 121 of player device 21 displays a map. On the map, a marked location 122 indicates location of the target and a marked location 123 indicates player location. For example, display 121 is an input/output device that includes a touchscreen that allows a player to communicate with the device. The input/output device includes the ability to receive input from a displayed keyboard. Alternatively or in addition, player device includes a separate hardware keyboard that allows information to be input to device 21.

In a block 61, shown in FIG. 5, player device 21 checks to see if the current time is within the start and stop time for the contest, as set in the game parameters. If not, in block 69, the operations of player device 21 pertaining to the daily contest ends.

In a block 62, the player attempts to reach the target. In a block 63, player device 21 makes a check to see if the target has been reached. This can be determined, for example, based in input from the player. When the player reaches the target, the player communicates this information to player device 21. Until the player communicates to player device 21 that the target has been reached, player device 21 assumes the target has not been reached.

In block 63, if the target has not been reached, in a block 64, player device 21 updates positions of the target and the player. The position of the target is updated, for example, based on communication from game server 13, or from tracking information otherwise available on target device 11. The position of the player device 21 is updated, for example, based on internal location information within player device 21, for example, from a GPS source. In block 60, the newly updated location position information is displayed on a game map.

In block 63, if the target has been reached, in a block 65, the target determines whether the player has reached the target in accordance with the winning number. If so, in a block 66, the player is deemed the winner and in a block 67, the target awards the grand prize to the player. In block 69, the operations of player device 21 pertaining to the daily contest ends.

If in block 65, the target determines the player has reached the target not in accordance with the winning number, in a block 68, player device 21 receives an award, such as a daily deal coupon or some other award. In addition, the player is entered into a raffle. In block 69, the operations of player device 21 pertaining to the daily contest ends.

When the contest has ended for all the players, in a block 700, a raffle is conducted. In a block 701, a consolation prize is awarded one of the players entered in the raffle.

Figure 6:
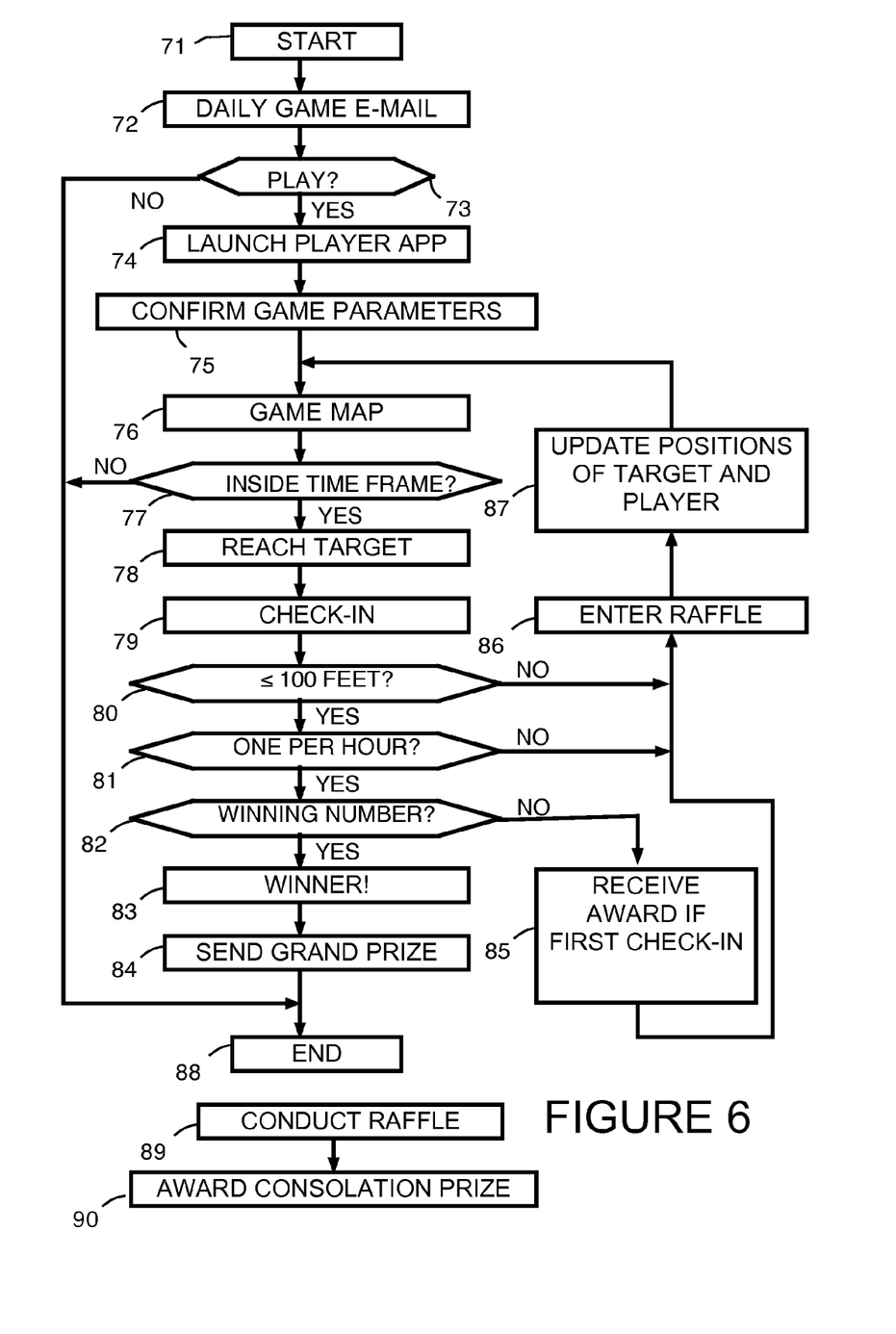
FIG. 6 is a simplified flowchart illustrating operations of a player device during participation in a contest in accordance with another embodiment.

FIG. 6 is a simplified flowchart illustrating operations of player device 21 during an example contest where the target can be stationary or mobile. This contest allows for delivery of prizes and awards electronically so there is no need for the target to be a person, although the target can still be a person. For example, a stationary target can just be a location.

In a block 71, the operations of player device 21 pertaining to a contest begins. In a block 72, a daily game e-mail is received. The daily game e-mail, for example, provides information about the contest including the prize and sponsor. Alternatively, other means can be used to communicate information about the contest such as, for example, a text message or instant message.

In a block 73, player device 21 offers the player the opportunity to play. If the player elects not to play, in a block 88, the operations of player device 21 pertaining to the daily contest ends.

If in block 73, the player elects to play, in a block 74, player device 21 launches a player application. The player application oversees operation of player device 21 pertaining to the remaining of the blocks set out in FIG. 6.

In a block 75, player device 21 confirms with game server 13 the game parameters. In a block 76, player device 21 displays a game map to the player. The game map includes a marked location of the target.

In a block 77, player device 21 checks to see if the current time is within the start and stop time for the contest, as set in the game parameters. If not, in block 88, the operations of player device 21 pertaining to the daily contest ends.

In a block 78, the player attempts to reach the target. In a block 79, player device 21 checks to see how close player device 21 is to the target. If, in a block 80, player device 21 is not within a predetermined distance (for example 100 feet) from the location, in a block 86, the player is entered in a raffle. In block 87, player device 21 updates positions of the target and the player. The position of the target is updated, for example, based on communication from game server 13, or from tracking information otherwise available on target device 11. The position of the player device 21 is updated, for example, based on internal location information within player device 21, for example, from a GPS source. If the target is fixed, it is not necessary to continuously update target location. In block 76 the newly updated location position information is displayed on a game map.

If in block 80 player device 21 is within the predetermined distance from the location, in a block 81, it is determined whether an hour has passed since the last time (if at all) player device 21 was within the predetermined distance and checked to see if it was the winning number contact. If in block 81, it is determined that, within the last hour, player device 21 was previously within the predetermined distance and checked to see if it was the winning number contact, then in block 86, the player is entered in a raffle. In block 87, player device 21 updates positions of the target and the player. In block 76 the newly updated location position information is displayed on a game map.

If in block 81 it is determined that within the last hour player device 21 did not previously while within the predetermined distance check to see if the player was the winning number, then in a block 82, the target determines whether the player has checked in within the predetermined distance from the target in accordance with the winning number. If so, in a block 83, the player is deemed the winner and in a block 84, the target awards the grand prize to the player. In block 88, the operations of player device 21 pertaining to the daily contest ends.

If in block 82, the target determines the player has checked in within the predetermined distance from the target not in accordance with the winning number, in a block 85, the player device 21 receives an award such as a daily deal coupon. For example, this is done only on the first time that the player checks in within the predetermined distance from the location. Then in block 86, the player is entered in a raffle. In block 87, player device 21 updates positions of the target and the player. In block 76 the newly updated location position information is displayed on a game map.

When the contest has ended for all the players, in a block 89, a raffle is conducted. In a block 90, a consolation prize is awarded one of the players entered in the raffle.

Figure 7:
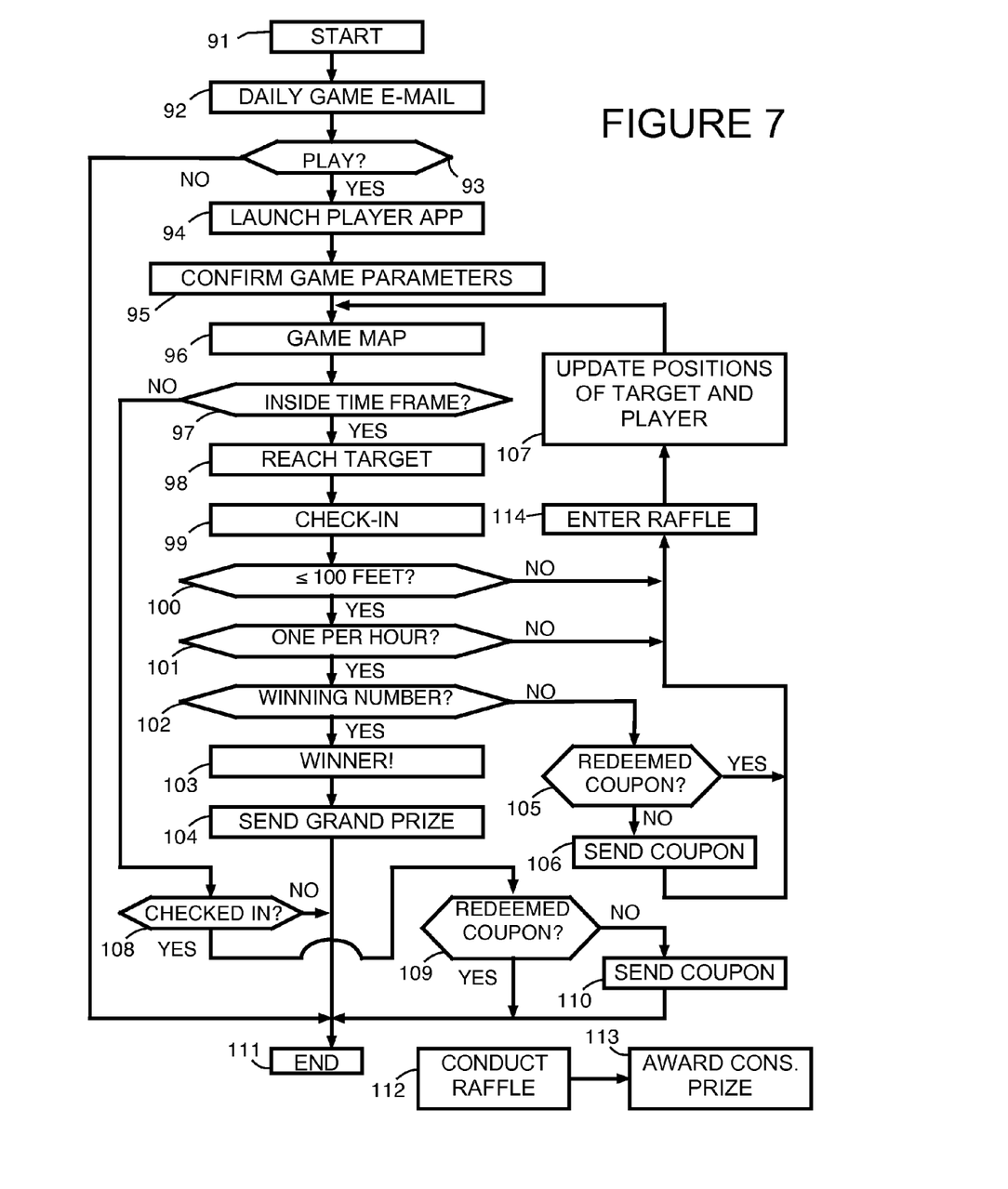
FIG. 7 is a simplified flowchart illustrating operations of a player device during participation in a contest in accordance with another embodiment.

FIG. 7 is a simplified flowchart illustrating operations of player device 21 during an example contest where the target can be stationary or mobile. This contest allows for delivery of prizes and awards electronically so there is no need for the target to be a person. For example, a stationary target can be a location.

In a block 91, the operations of player device 21 pertaining to a contest begins. In a block 92, a daily game e-mail is received. The daily game e-mail, for example, provides information about the contest including the prize and sponsor. Alternatively, other means can be used to communicate information about the contest such as, for example, a text message or instant message.

In a block 93, player device 21 offers the player the opportunity to play. If the player elects not to play, in a block 111, the operations of player device 21 pertaining to the daily contest ends.

If in block 93, the player elects to play, in a block 94, player device 21 launches a player application. The player application oversees operation of player device 21 pertaining to the remaining of the blocks set out in FIG. 7.

In a block 95, player device 21 confirms with game server 13 the game parameters. In a block 96, player device 21 displays a game map to the player. The game map includes a marked location of the target.

In a block 97, player device 21 checks to see if the current time is within the start and stop time for the contest, as set in the game parameters. If not, in a block 108, a determination is made as to whether the player has checked in within the predetermined distance from the target not in accordance with the winning number. If not, in block 111, the operations of player device 21 pertaining to the daily contest ends.

If in block 108, a determination is made that the player has checked in within the predetermined distance from the target not in accordance with the winning number, in a block 109, player device 21 communicates with game server 13 to determine whether a coupon has been redeemed by the player. If not, in a block 110, game server 13 sends a coupon, gift card or some other award to the player that can be redeemed at a commercial establishment near or at where the target is reached. In block 111, the operations of player device 21 pertaining to the daily contest ends.

In a block 98, the player attempts to reach the target. In a block 99, player device 21 checks to see how close player device 21 is to the target. If, in a block 100, player device 21 is not within a predetermined distance (for example 100 feet) from the location, in a block 114, the player is entered in a raffle. In a block 107, player device 21 updates positions of the target and the player. The position of the target is updated if not fixed, for example, based on communication from game server 13, or from tracking information otherwise available on target device 11. The position of the player device 21 is updated, for example, based on internal location information within player device 21, for example, from a GPS source. In block 96 the newly updated location position information is displayed on a game map.

If in block 100 player device 21 is within the predetermined distance from the location, in a block 101, it is determined whether an hour has passed since the last time (if at all) player device 21 previously was within the predetermined distance and checked to see if it was the winning number contact. If in block 101, it is determined that within the last hour, player device 21 was within the predetermined distance and checked to see if it was the winning number contact, then in block 114, the player is entered in a raffle. In block 107, player device 21 updates positions of the target and the player. In block 96 the newly updated location position information is displayed on a game map.

If in block 101, it is determined that within the last hour, player device 21 has not previously checked in while within the predetermined distance, in a block 102, the target determines whether the player has checked in within the predetermined distance from the target in accordance with the winning number. If so, in a block 103, the player is deemed the winner and in a block 104, the target awards the grand prize to the player. In block 111, the operations of player device 21 pertaining to the daily contest ends.

If in block 102, the target determines the player has checked in within the predetermined distance from the target not in accordance with the winning number, in a block 105, player device 21 communicates with game server 13 to determine whether a coupon or other award has been redeemed by the player. If not, in a block 106, game server 13 sends a coupon, gift card or other award to the player that can be redeemed at a commercial establishment near or at where the target is reached. Then in block 114, the player is entered in a raffle. In block 107, player device 21 updates positions of the target and the player. In block 96 the newly updated location position information is displayed on a game map. In one variation, a coupon or other award has been redeemed by the player When the contest has ended for all the players, in a block 112, a raffle is conducted. In a block 113, a consolation prize is awarded one of the players entered in the raffle.

Figure 9:
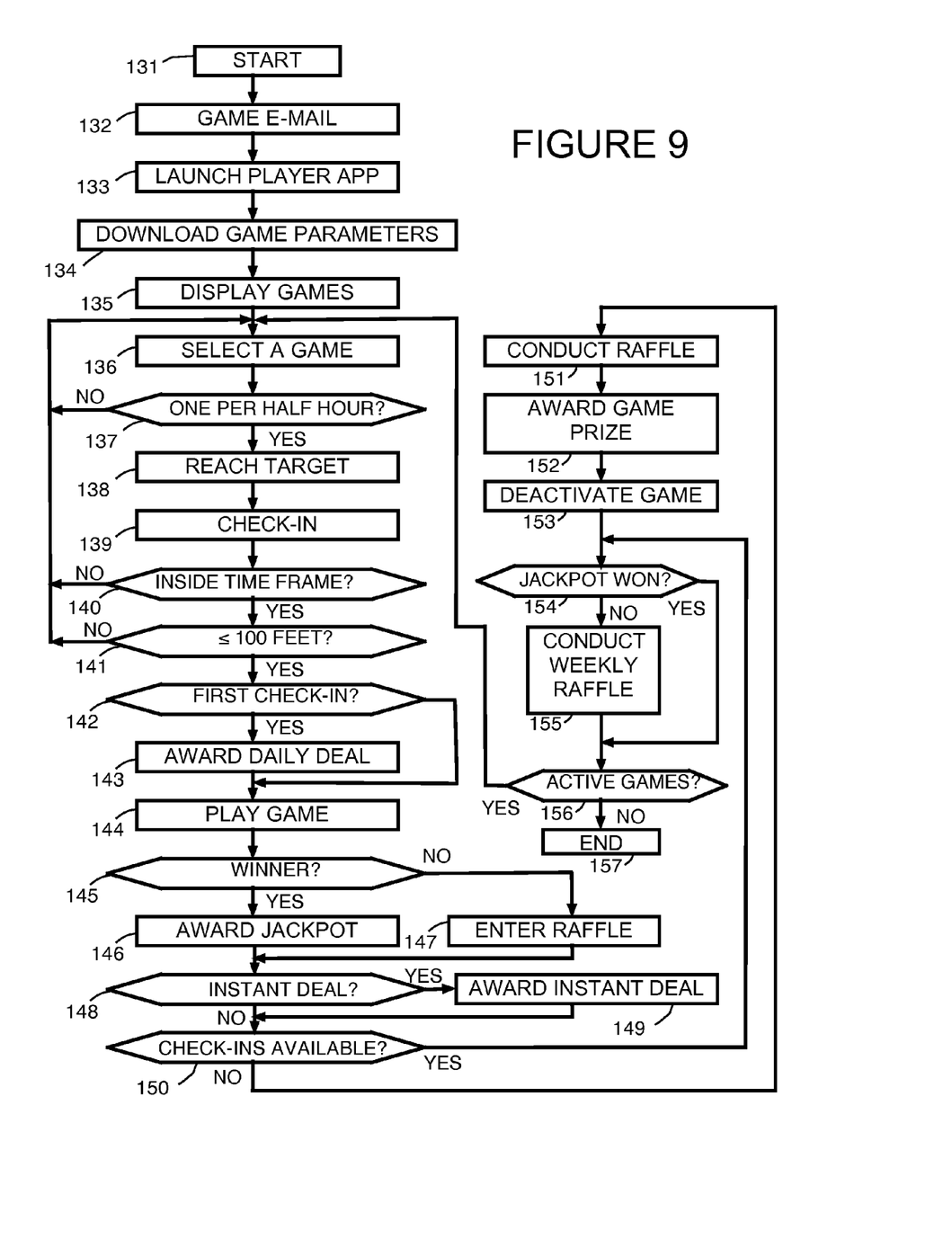
FIG. 9 is a simplified flowchart illustrating operations of a player device during participation in a contest in accordance with another embodiment.

FIG. 9 is a simplified flowchart illustrating operations of player device 21 during another variation of example contest. In a block 131, the operations of player device 21 pertaining to a contest begins. In a block 132, a game e-mail is received. The game e-mail, for example, provides information about the contest including the prize and sponsor. Alternatively, other means can be used to communicate information about the contest such as, for example, a text message or instant message. The communication can be sent daily, more often, or less often.

In a block 133, if the player elects to play, the player can launch a player application. The player application oversees operation of player device 21 pertaining to the remaining of the blocks set out in FIG. 9.

In a block 134, game parameters for all currently available games are downloaded from game server 13 to device 21. The game parameters for each game can include, for example, a game start date, a business name and picture, cash prizes and deals, location information, game times, and available check-ins.

In a block 135, games are displayed. The displayed games are, for example, games that are available to be played by the player. In a block 136, the player selects which game to play. For example, the geographic game target location to be visited during a game can be viewed by the player using either a list view of games or a map view. This allows the player to take this into account when deciding which game to play.

In a block 137, it is determined whether playing the game will be violating a game frequency requirement. For example, a player may be allowed to play a game at each game location at most once per half hour. If the player has played in the last half hour, i.e., has violated the game frequency violation, the player is not allowed to play this game until a half hour has elapsed. For example, on device 21, the display for the game will show a grayed out button that cannot be selected during the one half hour. Once the half hour has passed, the player is allowed to play at the game location.

A block 138 represents that the player has reached the game target location. A block 139 represents that the player has checked-in by selecting a check-in button displayed for the selected game on device 21.

In a block 140, a check is made by device 21 and/or game server 13 that the player checked in within a designated time frame for the game. That is, each game has, for example, a start time and an end time. For example, there may be one start time and one end time per day. If the player attempts to check before the start time or after the end time, the check-in is outside the time frame. In this case, device 21 reverts to allow the player to select a game in block 136. If the check-in is within the time frame for the game, the player proceeds to a block 141.

In block 141, a check is made by device 21 and/or game server 13 as to whether current location of the player, as measured by the location of device 21, is within a predetermined distance, such as 100 feet, of the game target location. For example, a GPS feature within device 21 is used to make the determination if the location of device 21 is within the predetermined distance. If the player attempts to check in and is not within the predetermined distance, device 21 reverts to allow the player to select a game in block 136. If the check-in occurs when device 21 is within the predetermined distance of the target location, the player proceeds to a block 142.

In block 142, a determination is by device 21 and/or game server 13 as to whether this is the first time the player has checked in to this game location within, for example, a week or some other predetermined length of time. If so, in a block 143, a daily deal is awarded by a business sponsor. For example, a player may be eligible to receive a daily deal once per calendar week (e.g., Monday through Sunday). If in block 142 the determination is made that is not the first time the player has checked in to this game location within predetermined length of time, block 143 is skipped.

In a block 144, the player, having been shown eligible to play a game by reaching the game target location within the time frame in which the game is played, is allowed to play the game which is selected for the player or is selected by the player. For example, the player is given a selection of games to play. The game could be in the form of a spin wheel or a slot machine or some other game that can be represented on the display of device 21. For example all games available to be selected represent a game of chance that can be played to win a jackpot or collect one or more raffle tickets. For example, there is only one jackpot that can be won from playing any game. In addition, there can be a game prize awarded for each game. For example, the jackpot is a progressive prize that continues to increase until it is won. For example, the jackpot can be won at any game location on any check-in. In addition to the jackpot, each player has opportunity to win the game prize for any game location the player reaches. When a game ends, the game prize is raffled off to all players that played at this game location. So a player has opportunity to win the jackpot and a game prize.

For example, in a block 145, it is determined whether the player wins a jackpot, as represented by a block 146, or obtains one or more raffle entries (e.g., raffle tickets), as represented by a block 147. For example, a raffle is held for each game target location to award with a game prize one or more players that reach the target game location and play the game. The raffle may be performed daily, or more or less often.

Optionally, an instant deal may be awarded to the player after the player completes the game. For example, each player can be awarded the instant deal at most once per day. This is represented by a block 148 where device 21 and/or server 13 determines whether the player has earned an instant deal within that day, or some other predetermined period of time. If the player is eligible for an instant deal, in a block 149, the instant deal is awarded. For example, the instant deal may be a coupon delivered to device 21 that provides a discount to the player or even a free gift.

In a block 150, the player can check to see if there is still time to check-in a game to play more. For example, the game may be the same game or be a different game than the one just played.

For each game, when there is no check-in available for the current game being played, a raffle is conducted. For example a raffle may be conducted for each game target location. Alternatively, raffles may be conducted for each game at a game target location, or, for example, a single raffle may be conducted for multiple game target locations. This is represented in FIG. 9 by a block 151 in which a raffle is conducted. In a block 152 a game prize is awarded to the winner of the raffle. The winner is notified, for example, by a message, e-mail or some other notification mechanism delivered, for example, to the player. After all awards for a game have been delivered, in a block 153 the game is deactivated. After block 153 and if in block 150 there are check-ins available, in a block 154, a check is made if a jackpot has been won. If not, in a block 155, a raffle is conducted. For example, if the jackpot was not won in for a particular week (i.e. Mon thru Sun), a "weekly" raffle is conducted. One example, the raffle can be for a small part of the jackpot (e.g., $50 of a $1000 jackpot). Eligible players for the jackpot can be, for example, every player that played at any game location in that particular week. In a block 156 a check is made if there are still active games. If so, the player can return to block 136 to select a game to play. If there are no active games, in a block 157, the operations of player device 21 pertaining to the contest ends. If in block 150 there are check-ins available, in block 154, a check is made if a jackpot has been won.

The foregoing discussion discloses and describes merely exemplary methods and embodiments. As will be understood by those familiar with the art, the disclosed subject matter may be embodied in other specific forms without departing from the spirit or characteristics thereof. Accordingly, the present disclosure is intended to be illustrative, but not limiting, of the scope of the invention, which is set forth in the following claims.

I claim:

1. A method for implementing a contest comprising:
   downloading game parameters from a server to a player device in response to a player app being launched on the player device;
   displaying, by the player device, available games that can be played by a player, the games including target game locations from which the games can be played;
   restricting a frequency at which the player can play each game;
   allowing a player to select a game to play only when the player is within a predetermined distance of a target game location and when check-ins are still available for the game, including:
      using global positioning system hardware within the player device to receive global positioning information for the player device which the player device uses to determine a current location of the player device, the current location of the player device being used to determine when the player is within the predetermined distance of the target game location, and
      preventing, by the player device, the player from selecting a game to play when the player is not within the predetermined distance of the target game location;
   awarding a daily deal to the player when the player checks in to the target game location and has not yet received the daily deal;
   awarding a jackpot prize to the player if the player is a winner of a game selected by the player;
   entering the player in a raffle if the player is not the winner of the game selected by the player; and,
   conducting the raffle when there are no longer check-ins available for the game.

2. A method as in claim 1 wherein game parameters include a game start date, a business name and picture, cash prizes and deals, location information, game times, and available check-ins.

3. A method as in claim 1 wherein the frequency at which the player can play each game is once per half hour.

4. A method as in claim 1 wherein games that can be selected by the player include a spin wheel and a slot machine.

5. A method as in claim 1 wherein the predetermined distance of the target game location is 100 feet.

6. A method as in claim 1 wherein after playing the game, the player has opportunity to earn an instant deal.

7. A method for implementing a contest, the method conducted by a game server responsive to an administrator, the method comprising:
   providing for game parameters to be downloaded from the server to a player device in response to a player app being launched on the player device, wherein the player device displays available games that can be played by a player, the games including target game locations from which the games can be played;

restricting a frequency at which the player can play each game;

allowing a player to select a game to play only when the player is within a predetermined distance of a target game location and when check-ins are still available for the game, including:
  using global positioning system hardware within the player device to receive global positioning information for the player device which the player device uses to determine a current location of the player device, the current location of the player device being used to determine when the player is within the predetermined distance of the target game location, and
  preventing, by the player device, the player from selecting a game to play when the player is not within the predetermined distance of the target game location;

awarding a daily deal to the player when the player checks in to the target game location and has not yet received the daily deal;

awarding a jackpot prize to the player if the player is a winner of a game selected by the player;

entering the player in a raffle if the player is not the winner of the game selected by the player; and, conducting the raffle when there are no longer check-ins available for the game.

8. A method as in claim 7 wherein game parameters include a game start date, a business name and picture, cash prizes and deals, location information, game times, and available check-ins.

9. A method as in claim 7 wherein the frequency at which the player can play each game is once per half hour.

10. A method as in claim 7 wherein games that can be selected by the player include a spin wheel and a slot machine.

11. A method as in claim 7 wherein the predetermined distance of the target game location is 100 feet.

12. A method as in claim 7 wherein after playing the game, the player has opportunity to earn an instant deal.

13. A method as in claim 7 wherein the jackpot is a progressive jackpot that increases in value until the jackpot is won.

14. A device that implements a contest comprising:
  network connectivity hardware that downloads game parameters from a server in response to a player app being launched on the device;
  a physical display that displays available games that can be played by a player, the games including target game locations from which the games can be played, wherein the device limits a frequency at which the player can play each game; and,
  input/output hardware that allows a player to select a game to play only when the player is within a predetermined distance of a target game location and when check-ins are still available for the game and allows the device to communicate with the player, wherein the device awards a daily deal to the player when the player checks in to the target game location and has not yet received the daily deal, wherein the device awards a jackpot prize to the player if the player is a winner of a game selected by the player, and wherein the device enters the player in a raffle if the player is not the winner of the game selected by the player, the raffle being conducted when there are no longer check-ins available for the game; and,
  global positioning system hardware that receives global positioning information used to determine a current location of the device, the current location of the device being used to determine when the player is within the predetermined distance of the target game location;
  wherein the device prevents the player from selecting a game to play when the player is not within the predetermined distance of the target game location.

15. A device as in claim 14 wherein game parameters include a game start date, a business name and picture, cash prizes and deals, location information, game times, and available check-ins.

16. A device as in claim 14 wherein the frequency at which the player can play each game is once per half hour.

17. A device as in claim 14 wherein games that can be selected by the player include a spin wheel and a slot machine.

18. A device as in claim 14 wherein the predetermined distance of the target game location is 100 feet.

19. A device as in claim 14 wherein after playing the game, the player has opportunity to earn an instant deal.

20. A device as in claim 14 wherein the jackpot prize is a progressive jackpot prize that increases in value until the jackpot prize is won.

* * * * *